United States Patent [19]

Chadwick

[11] Patent Number: 5,557,640
[45] Date of Patent: Sep. 17, 1996

[54] PHASE AND AMPLITUDE EQUALIZATION ARRANGEMENT

[75] Inventor: Peter E. Chadwick, Swindon, United Kingdom

[73] Assignee: Plessey Semiconductor Limited, United Kingdom

[21] Appl. No.: 269,074

[22] Filed: Jun. 30, 1994

[30] Foreign Application Priority Data

Jul. 16, 1993 [GB] United Kingdom ............... 9314851

[51] Int. Cl.⁶ ........................... H03H 7/30; H03K 5/159
[52] U.S. Cl. ........................ 375/229; 375/331; 375/349; 455/63; 455/65
[58] Field of Search ................................ 375/229, 231, 375/284, 345, 346, 349; 455/63, 65, 67.3, 296, 303, 304

[56] References Cited

U.S. PATENT DOCUMENTS

| | | | |
|---|---|---|---|
| 4,673,979 | 6/1987 | Kobo et al. | 375/229 |
| 5,170,489 | 12/1992 | Glazebrook | 455/63 |
| 5,265,125 | 11/1993 | Ohta | 375/229 |

FOREIGN PATENT DOCUMENTS 2159374A  11/1905  United Kingdom .
1246209   9/1971   United Kingdom .

Primary Examiner—Stephen Chin
Assistant Examiner—Don Vo
Attorney, Agent, or Firm—Kirschstein, et al.

[57] ABSTRACT

An equalisation arrangement compensates for multipath phase and amplitude distortion effects in a transmission channel by first measuring such distortion effects as they occur over time in a calibration phase, thereby obtaining phase and amplitude compensation factors, then applying these factors to a correcting circuit situated in the signal path of the receiver at the appropriate times during a subsequent data transmission phase. Calibration is achieved by feeding a received calibration signal to an amplifier, preferably a successive detection logarithmic amplifier (26), comparing the phase of the limited linear output of the logarithmic amplifier with a delayed version of itself (30, 28), and using the amplitude information (39) in the logarithmic output (72) of the logarithmic amplifier (26) and the phase-change information (35) resulting from the phase comparison to compute the phase and amplitude compensation coefficients. In the data transmission phase, the compensation coefficients are applied to amplifiers and multipliers, etc (56, 55), in the correcting circuit.

12 Claims, 3 Drawing Sheets

PHASE AND AMPLITUDE EQUALIZATION ARRANGEMENT

BACKGROUND OF THE INVENTION

The invention relates to an equalisation arrangement, and in particular an equalisation arrangement for use in a communications system for the correction of phase and amplitude distortion errors caused by multipath propagation effects and the like.

Communications systems employing radio, ultra-sonic, infra-red or optical transmission are well known in the art. It is a common problem in such systems, however, that under certain circumstances propagation of the transmitted signal takes place not only along one path, but along two or more paths simultaneously. When this occurs, multiple signals are received at the receiving antenna at times which depend on the length of the individual propagation paths. The result may be distortion in both the phase and amplitude of the received signal. Such a situation is illustrated in FIG. 1. Line (a) of FIG. 1 shows the situation at a time $t_1$ as a receive antenna picks up a transmitted signal 10 of wavelength X and zero-crossing phase of 0, $\pi$, $2\pi$, etc relative to the ordinate 11. This is a signal from a direct propagation path. Subsequently, at a time $t_2$, the same signal but from a different propagation path arrives at the antenna and interferes with the already received signal in (a). This newly arrived signal is shown as signal 12 in line (b) of FIG. 1. The result of the superimposition of the two signals 10 and 12 is the dotted waveform 13 and this waveform can be seen both to have a larger amplitude than signal 10 and to bear a different zero-crossing phase relationship with it, namely $\theta_1$, $\pi+\theta_1$, $2\pi+\theta_1$, etc.

Finally, due to a further propagation path, a third signal 14 arrives at the antenna (see line (c)) and this interferes with the composite signal 13 to produce a final composite 15 having still greater amplitude, due to constructive interference, and a phase relationship of $\theta_2$, $\pi+\theta_2$, $2\pi+\theta_2$, etc, relative to signal 10.

Thus it can be seen that the effect of multipath propagation is to distort the amplitude and phase characteristics of the received signal with respect to the transmitted signal. Note that, for simplicity, signals 12 and 14 have been shown to have the same amplitude as signal 10; in reality, their amplitude may well be much smaller due to attenuation factors in transmission, resulting in a composite waveform 15 manifesting amplitude and phase distortions less severe than those shown in line FIG. 1.

Such distortion can be especially troublesome when digitally modulated signals are being received, as, when the distortion is severe enough, the information relating to one symbol in a data chain can interfere with the information relating to the next symbol in the chain, or even symbols further on.

It is an aim of the invention to provide an equalisation arrangement which compensates for the above-mentioned amplitude and phase distortion effects.

SUMMARY OF THE INVENTION

According to a first aspect of the invention, there is provided an equalisation arrangement, for use in a receiver for the correction of phase and amplitude distortion due to, for example, multipath propagation effects, comprising: amplifying means for amplifying a signal received by the receiver, the amplifying means having an input fed by the received signal and first and second outputs representative of the amplitude and phase, respectively, of the signal at the input; phase-detecting means for detecting a disturbance in the phase of the received signal, the phase-detecting means being fed from the second output of the amplifying means; and correcting means for correcting for the phase and amplitude distortion effects, the correcting means being disposed in the path of the received signal downstream of the input of the amplifying means and having first and second inputs connected to the first output of the amplifying means and to an output of the phase detecting means, respectively, the correcting means being arranged to adjust the amplitude and phase of the received signal in response to disturbances in amplitude and phase detected by the amplifying means and phase detecting means, respectively.

The compensation afforded by this equalisation arrangement has a number of applications apart from simply maintaining the integrity of received data. Such applications include the improvement of accuracy in secondary radar and distance measuring systems, and also use in radar systems as an electronic counter counter measure (ECCM) where active jamming of a radar signal takes place.

Preferably, the phase detecting means comprises a phase detector and a delay line, one end of the delay line being connected to a first input of the phase detector and the other end of the delay line being connected to a second input of the phase detector and to the second input of the amplifying means. Such an arrangement enables the phase detecting means to detect discontinuites in phase of the received signal, as occur when further signals are superimposed on an existing signal, e.g. due to multipath propagation.

The phase detector may be implemented in various ways, for example as a quadrature demodulator, a phase-locked loop, etc.

Advantageously, the amplifying means may be realised as a successive detection logarithmic amplifier, in which case the first output of the amplifying means is the detected logarithmic output of the logarithmic amplifier, and the second output of the amplifying means is the limited linear output of the logarithmic amplifier. Use of a logarithmic amplifier enables signal compression to take place, but without the attack time limitations that apply to, for example, conventional AGC circuits. Further, the use of a successive detection logarithmic amplifier enables a wide dynamic range to be obtained while maintaining a wide bandwidth.

The correcting means may comprise a storage means for storing quantities related to the magnitude of amplitude and phase disturbances that occur in a calibration signal received during a calibration phase, and retrieval means for retrieving those quantities during a later compensation phase and applying them to a data signal received during the compensation phase.

The correcting means may comprise analogue-to-digital converting means for converting the disturbance quantities into digital form, and a processing means for receiving those digital disturbance quantities and deriving therefrom correction coefficients for storage in the storage means.

According to a second aspect of the invention, there is provided a method of correcting for amplitude and phase distortion effects in a transmission system due to, for example, multipath propagation, comprising a calibration phase and a compensation phase, the calibration phase comprising the steps of: transmitting a calibration signal; receiving the calibration signal and feeding it to an amplifying means, the amplifying means providing on separate outputs signals representative of the amplitude and phase, respectively, of the received calibration signal; detecting in a phase-detecting means a disturbance in the phase of the signal at the phase output of the amplifying means; deriving from the amplitude output of the amplifying means and from an output of the phase-detecting means amplitude and phase compensation signals for use during the compensation phase, the compensation signals being related to disturbances in amplitude and phase as they occur over time, the compensation phase comprising the application, over time, of said compensation signals to a correcting means situated in the path of the received signal, such as to compensate for said amplitude and phase distortion effects.

The compensation signals may be Used to adjust amplitude and phase characteristics of correcting elements within the correcting means.

The calibration signal may be either a channel sounding pulse transmitted separately from dam, or a preamble transmitted at the head of a data string, the preamble having known phase and amplitude characteristics.

BRIEF DESCRIPTION OF THE DRAWINGS

The invention will now be described, by way of example only, with reference to the drawings, of which.

DETAILED DESCRIPTION OF THE INVENTION

Figure 2:
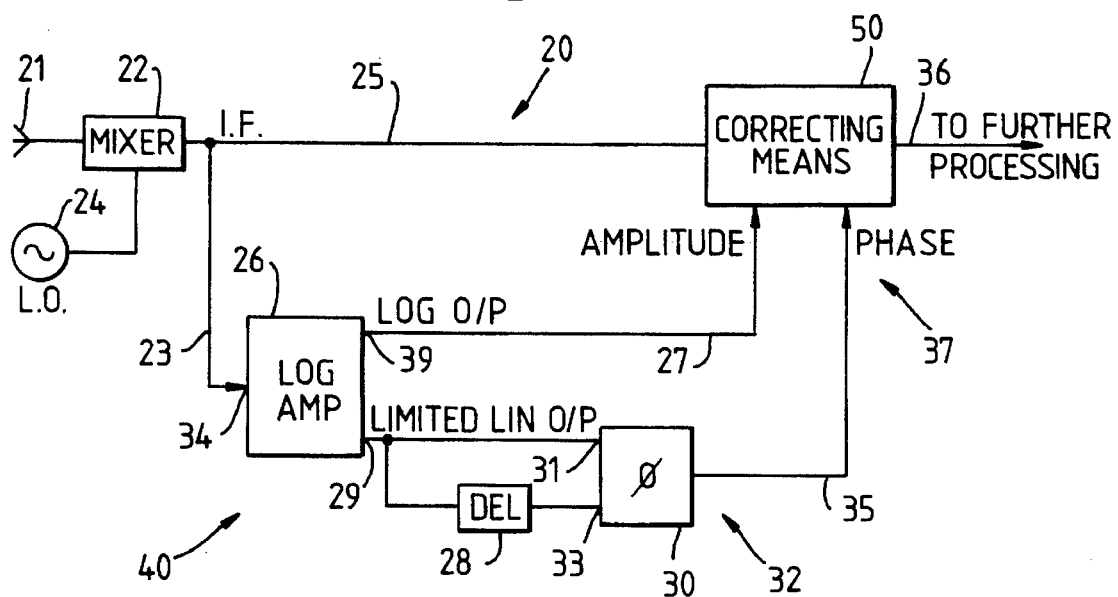
FIG. 2 is a schematic diagram of a receiver incorporating an equalisation arrangement according to the invention.

A radio receiver utilising the equalisation arrangement of the invention is shown in FIG. 2. In FIG. 2, a mixer 22 receives on one input a transmitted RF signal picked up by an antenna 21 and on another input a local oscillator signal supplied by a local oscillator 24. The output of the mixer 22, which is at Intermediate frequency, feeds on the one hand, on a line 23, an equalisation arrangement 40 according to the invention, and on the other hand, on a line 25, a correcting means 50, which lies in the path of the IF signal on its way to further processing such as further amplification, demodulation, etc.

The equalisation arrangement 40 consists of a logarithmic amplifier (log amp) 26, to be described in greater detail below, which receives the IF signal from the mixer and provides, on two outputs, control signals 37 to the correcting means 50, both directly on a line 27 and indirectly on a line 35 via a phase detecting means 32. The phase detecting means 32 comprises a phase detector 30 which has two inputs 31 and 33, the first of which, 31, is connected directly to a linear output 29 of the log amp 26, and the second of which, 33, is connected to the same linear output 29 via a delay line 28. The other output 39 of the log amp 26 provides a signal proportional to the logarithm of the input voltage at the input 34 of the log amp 26.

Figure 4:
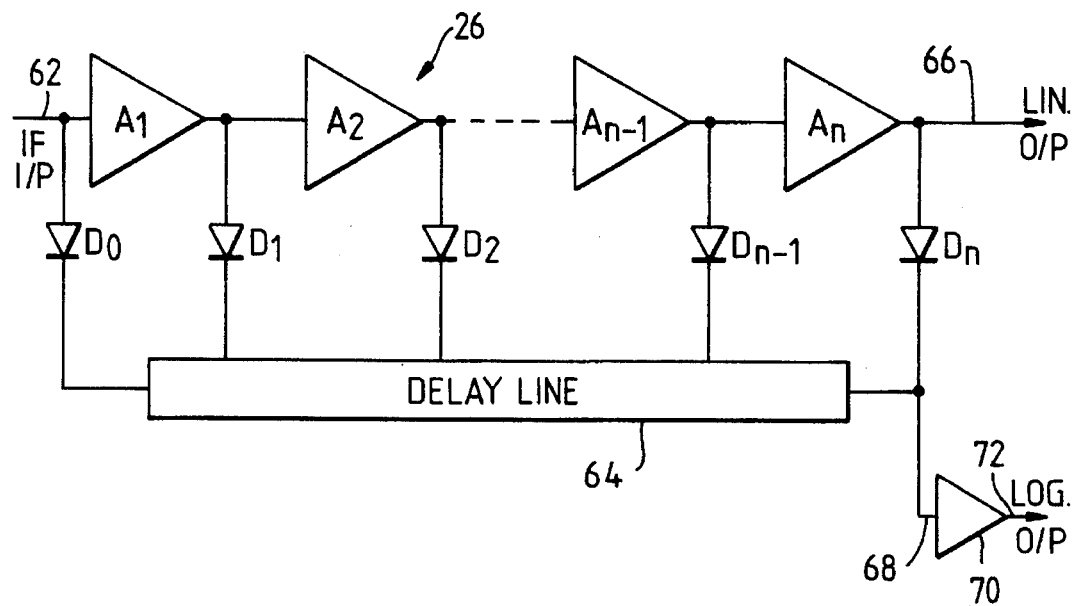
FIG. 4 is a schematic diagram of a successive detection logarithmic amplifier as employed in the equalisation arrangement according to the invention.
Figure 5:
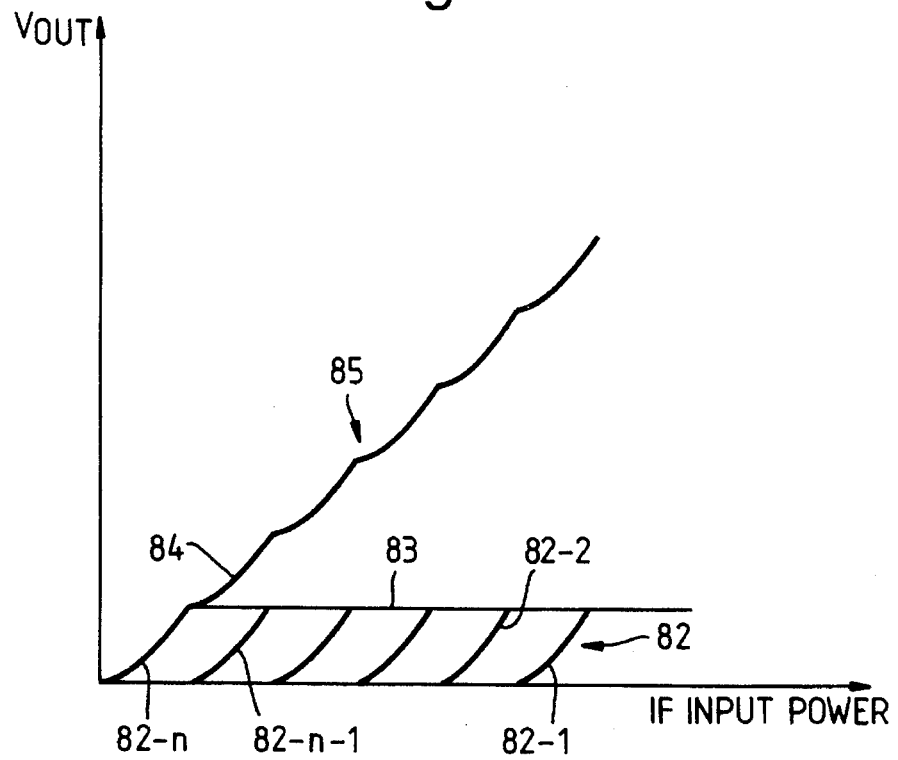
FIG. 5 is a graph of output voltage versus input power for the logarithmic amplifier illustrated in FIG. 4.

The log amp 26 is now described in greater detail with the aid of FIGS. 4 and 5.

Log amp 26 is constituted by what is known in the art as a "successive detection" log amp and the construction of this device is shown in FIG. 4. The successive detection log amp 26 consists of a number n of identical linear limiting amplifying stages $A_1$ to $A_n$ connected in cascade. The output of each stage is detected in a detector $D_1$–$D_n$, the input 62 to the whole device being also detected in a detector $D_0$. The outputs of detectors $D_0$–$D_n$ are summed in a delay line 64, the delay line serving to compensate for propagation delays through the amplifier/detector chain, and the output of the delay line 64 is taken to a video amplifier 70 which provides, on an output 72, a signal proportional to the logarithm of the input voltage. Finally, a further output 66 is taken from the output of the final amplifying stage $A_n$. This output is the input voltage multiplied by a gain of $A^n$, but limited to the common output limiting voltage of all the gain stages.

The operation of the log amp is now described with the aid of FIGS. 4 and 5.

Each stage $A_1$, $A_2$, etc. is a linear amplifying stage having a gain characteristic as shown at 82 in FIG. 5. The characteristic for the first stage $A_1$ is shown as 82-1, that for the second stage $A_2$ is shown as 82-2, and so on, up to the characteristic 82-n for the nth stage. Since the individual amplifiers themselves are linear, plotting their gain characteristic as output voltage versus input power in dB will produce not a linear gain curve but an anti-log gain curve, as shown in FIG. 5. In addition, each amplifier is arranged to limit at a level 83. Thus now, when a signal appears at the input 62 of the log amp 26, detector $D_n$ will be the first detector to become active, owing to the signal at the output 66 being amplified by a factor $A^n$ relative to the input 62. The output of detector $D_n$, amplified in the video amplifier 70, will therefore follow the curve 82-n in FIG. 5.

As the signal at the input 62 rises further, amplifier $A_n$ reaches the limits of its linear operation and goes into saturation. This is shown by the line 83 in FIG. 5. When this occurs, amplifier $A_{n-1}$ starts to drive its detector $D_{n-1}$ into operation and this produces at the output of detector Dn4 an output following the curve 82-n-1. However, this output is now summed with that for detector $A_n$, which is at the limiting level 83, and therefore the total output from the video amp 70 is as shown at 84 in FIG. 5. This process continues for all the stages $A_n$ to $A_1$ in turn as the input signal rises, so that the complete characteristic for the whole log amp is the piecewise curve 85 in FIG. 5. It will be noticed that this curve is an approximate straight line, resulting in, as is to be expected, a logarithmic gain characteristic for the log amp as a unit. The number of stages used is dictated by the dynamic range required for the log amp.

The signal on the output 66 of the log amp (see FIG. 4) is not a composite signal, as is the logged detected signal at the output 72, but is an amplitude-limited signal whose main use is the preservation of phase information which is lost in the detecting/logging process. Thus the two output signals on lines 66 and 72 carry, respectively, phase and amplitude information regarding the signal at the input of the log amp.

It is evident that, by using linear amplifying stages in the log amp, unavoidable deviations from a true logarithmic curve (straight line) are obtained. However, by restricting the operation of each amplifying stage to only that part of its gain curve in which deviation from linearity does not exceed a certain limit, an acceptable straight line approximation 85 can be obtained.

Also, it is not necessary to use a delay line 64 in the summing process if wideband differential amplifiers are used for the amplifier and detector stages.

Figure 1A:
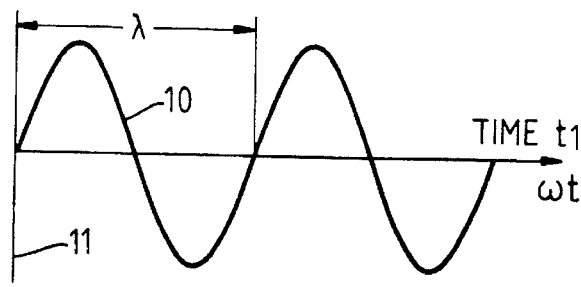
FIG. 1 shows the amplitude and phase changes in a received signal when the signal is received over a number of propagation paths.
Figure 1B:
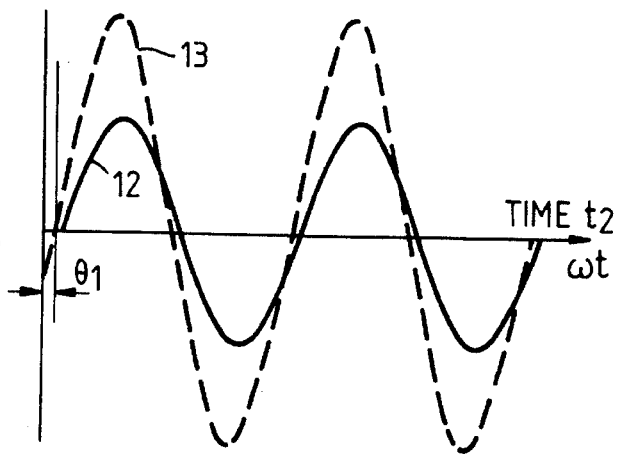
Figure 1C:
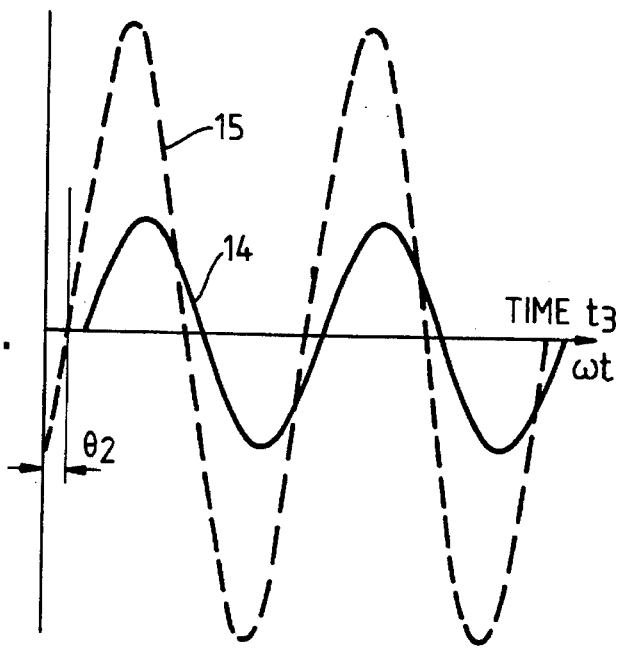

Referring again to FIGS. 1 and 2, the operation of the equalisation process is as follows:

The equalisation arrangement is first calibrated by arranging for a so-called channel sounding pulse to be transmitted to the receiver 20. This transmission enables the characteristics of the transmission channel which is to be used to be ascertained so that phase and amplitude correction can then take place within the receiver. It is assumed that the channel sounding pulse takes the form of a burst of a sinusoidal waveform such as the signal 10 of FIG. 1. The channel sounding pulse is received by the receiver 20, converted to IF in the mixer 22 and passed via line 23 to the equalisation arrangement 40, where it is converted into, on the one hand, a log-amplified signal on output 39 and, on the other hand, a limited linear-amplified signal on output 29 of the log amp 26.

The limited linear-amplified signal on output 29 is taken to the phase detecting means 32, where it is compared with a delayed version of itself. This is achieved by means of the delay line 28, the phase detector 30 comparing the signal appearing at the input of the delay line with that appearing at its output. The phase detector 30 is so designed, in conjunction with the delay inherent in the delay line 28, that when the received signal is at a nominal carrier frequency, the phase detector 30 is in the middle of its range. Both the output of the phase detector 30 and the log output 39 of the log amp 26 are taken to the correcting means 50, which processes the information contained in these outputs for use during a subsequent data transmission phase.

It is now assumed that the transmitted channel sounding pulse arrives a second time at the antenna 21, i.e. at time $t_2$ (see FIG. 1), having travelled along a second propagation path. At the moment of reception of this second input, the IF signal at the output of the mixer 22 will exhibit both a change in amplitude and a change in phase, as illustrated by the waveform 13 of FIG. 1. The change in amplitude is passed directly on to the correcting means 50, after being log-amplified in the log amp 26, while the change in phase ($\theta_1$) is first detected in the phase detecting means 32, as is now to be explained.

At the moment of arrival of the limited, linear-amplified IF signal 13 at the input of the phase detecting means 32, this new signal 13 is passed straight to the input 31 of the phase detector 30; however, the input 33 of the phase detector 30 still sees a delayed version of the old, directly propagated, signal 10. The result is that the original phase difference seen by the phase detector 30 is changed by an angle $\theta_1$, and this change or discontinuity, together with the change in amplitude obtained from the output 39 of the log amp 26, is recorded in the correcting means 50 along with a record of the time at which these changes took place relative to the initial receipt of the first signal 10 (the directly received channel sounding pulse).

At some later time $t_3$ the channel sounding pulse arrives at the antenna 21 via a third propagation path, giving rise to a second discontinuity in the amplitude and phase (waveform 15 of FIG. 1) of the IF signal at the output of the mixer 22. As in the previous case, when this new signal 15 reaches the phase detecting means 32 the input 33 of the phase detector 30 still sees the previous (second propagation path) signal, corresponding to signal 13 in FIG. 1, whereas the input 31 of the phase detector 30 sees the new (third propagation path) signal, corresponding to signal 15. This gives rise to a second change $\theta_2$, relative to signal 10, which is registered by the phase detector 30. This change in phase, together with the associated change in amplitude, is, as before, correlated in the correcting means 50 with the time of occurrence of these changes.

Figure 3:
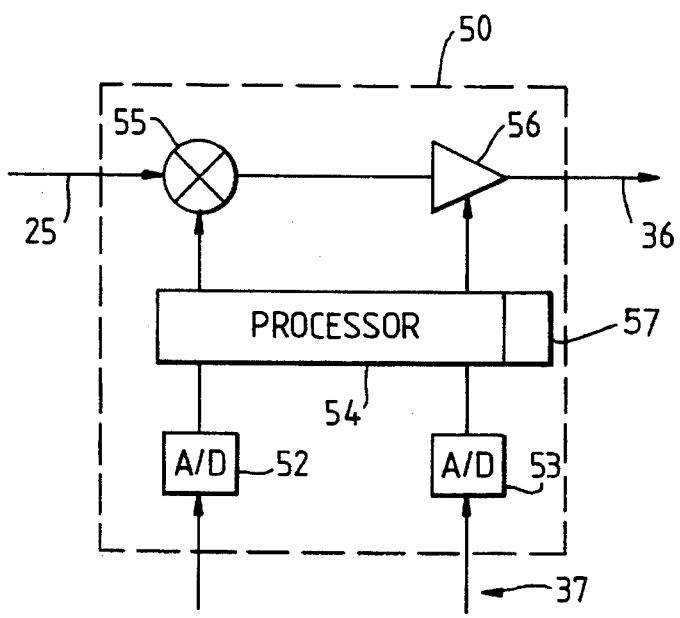
FIG. 3 is a schematic diagram of the correcting block shown in FIG. 2.

Referring now to FIG. 3, the control signals 37 entering the correcting means 50 are first convened to digital form by means of AJD converters 52, 53 and are then processed in a processor 54, where the required coefficients of phase and amplitude for the correction of phase and amplitude distortion effects are computed and used to adjust the gain and phase factors of one or more multipliers and amplifiers 55, 56 in the signal path. The processor also keeps track of the time that elapses between changes in amplitude and phase as seen by the output 39 of the log amp 26 and the phase detecting means 32, respectively.

Calibration having been completed, data transmission may now start. During reception of data, the phase and amplitude characteristics of the amplifier(s) and multiplier(s) 55, 56 in the correcting means 50 are adjusted by amounts previously calculated by the processor 54 on the basis of information gleaned from the log amp logging output 39 and the phase detecting means 32, at times previously registered by the processor 54. In this way the effects of multipath distortion are compensated for in the receiver 20.

In a second embodiment of the invention (not illustrated), instead of using a channel sounding pulse to effect calibration, a data transmission preamble having known phase and amplitude characteristics is employed at the very start of transmission, and quantities related to the magnitude of amplitude and phase disturbances that occur during this calibration are stored in storage means 57. Calibration thus takes place before each transmission of data and is used to effect distortion cancellation during the subsequent transmission of the data portion of the transmitted string.

I claim:

1. An equalization arrangement for use in a receiver for the correction of phase and amplitude distortion effects, comprising: amplifying means for amplifying a signal received along a received signal path by the receiver, said amplifying means having an input fed by the received signal and first and second outputs representative of the amplitude and phase, respectively, of the signal at the input; phase detecting means for detecting a disturbance in the phase of the received signal, said phase detecting means being fed from the second output of the amplifying means; and correcting means for correcting for the phase and amplitude distortion effects, said correcting means having first and second inputs, means connecting said correcting means in the received signal path of the amplifying means, means connecting said first and second inputs of said connecting means to the first output of the amplifying means and to an output of the phase detecting means, respectively, said correcting means being arranged to adjust the amplitude and phase of the received signal in response to disturbances in amplitude and phase detected by the amplifying means and phase detecting means, respectively.

2. The equalization arrangement as claimed in claim 1, in which the phase detecting means comprises a phase detector, a delay line, means connecting one end of the delay line to a first input of the phase detector and means connecting another end of the delay line to a second input of the phase detector and to the second output of the amplifying means.

3. The equalization arrangement as claimed in claim 1, in which the amplifying means is a successive detection logarithmic amplifier, the first output of the amplifying means being constituted by the detected logarithmic output of the logarithmic amplifier, and the second output of the amplifying means being constituted by the limited linear output of the logarithmic amplifier.

4. The equalization arrangement as claimed in claim 1, in which the correcting means comprises a storage means for storing quantities related to the magnitudes of amplitude and phase disturbances that occur in a calibration signal received by the receiver during a calibration phase, and retrieval means for retrieving said quantities during a later compensation phase and using them to correct for amplitude and phase disturbances in a data signal received by the receiver during the compensation phase.

5. The equalization arrangement as claimed in claim 4, in which the correcting means further comprises analogue-to-digital converting means for converting the magnitudes of the amplitude and phase disturbances from the amplifying means and phase detecting means, respectively, into digital form, and a processing means for deriving therefrom correction coefficients for storage in the storage means.

6. A method of correcting for amplitude and phase distortion effects in a transmission system having a calibration phase and a compensation phase, comprising the steps of:

a) during said calibration phase: transmitting a calibration signal; receiving the calibration signal over a received signal path and feeding the calibration signal to an amplifying means, said amplifying means providing on separate outputs signals representative of the amplitude and phase, respectively, of the received calibration signal; detecting in a phase detecting means a disturbance in the phase of the signal at the phase output of the amplifying means; deriving from the amplitude output of the amplifying means and from an output of the phase detecting means amplitude and phase compensation signals for use during the compensation phase, the compensation signals being related to disturbances in amplitude and phase as they occur over time, and b) during said compensation phase: applying, over time, said compensation signals to a correcting means connected in the received signal path of the received signal such as to compensate for said phase and amplitude distortion effects.

7. The method as claimed in claim 6, in which the compensation signals are used to adjust amplitude and phase characteristics of correcting elements within the correcting means.

8. The method as claimed in claim 7, further comprising the step of storing quantities corresponding to the magnitudes of the compensation signals during the calibration phase and retrieving those quantities during the compensation phase.

9. The method as claimed in claim 8, further comprising the step of converting the magnitude quantifies of the compensation signals into digital form, deriving compensation coefficients from said digital quantities, and storing said coefficients for retrieval during the compensation phase.

10. The method as claimed in claim 6, in which the phase detecting means detects a disturbance in the phase of the received signal by comparing, in a phase detector, the phase output of the amplifying means with a delayed version of itself.

11. The method as claimed in claim 6, in which the calibration signal is a channel sounding pulse transmitted separately from data.

12. The method as claimed in claim 6, in which the calibration signal is a preamble transmitted at the head of a data string, the preamble having known phase and amplitude characteristics.

* * * * *